US009455807B2

United States Patent
Jeong et al.

(10) Patent No.: US 9,455,807 B2
(45) Date of Patent: Sep. 27, 2016

(54) WIRELESS COMMUNICATION SYSTEM AND RANDOM ACCESS METHOD THEREOF

(75) Inventors: Kyeong In Jeong, Hwaseong-si (KR); Soeng Hun Kim, Suwon-si (KR); Jung Soo Jung, Seongnam-si (KR); Sang Bum Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 370 days.

(21) Appl. No.: 13/521,117

(22) PCT Filed: Jan. 11, 2011

(86) PCT No.: PCT/KR2011/000175
§ 371 (c)(1),
(2), (4) Date: Jul. 9, 2012

(87) PCT Pub. No.: WO2011/084033
PCT Pub. Date: Jul. 14, 2011

(65) Prior Publication Data
US 2013/0064191 A1  Mar. 14, 2013

(30) Foreign Application Priority Data

Jan. 11, 2010 (KR) .................. 10-2010-0002166
Jan. 19, 2010 (KR) .................. 10-2010-0004801

(51) Int. Cl.
*H04L 5/00* (2006.01)
*H04W 74/08* (2009.01)

(52) U.S. Cl.
CPC .............. *H04L 5/001* (2013.01); *H04W 74/08* (2013.01)

(58) Field of Classification Search
None
See application file for complete search history.

(56) References Cited

U.S. PATENT DOCUMENTS

| 8,509,792 B1* | 8/2013 | Oroskar ............... H04W 72/02 370/328 |
|---|---|---|
| 2008/0019307 A1* | 1/2008 | Tenny et al. .................. 370/329 |
| 2008/0233940 A1* | 9/2008 | Jen .................. 455/418 |
| 2009/0042582 A1* | 2/2009 | Wang et al. .................. 455/450 |
| 2010/0067470 A1* | 3/2010 | Damnjanovic ....... H04L 5/0053 370/329 |
| 2010/0296467 A1* | 11/2010 | Pelletier et al. ............. 370/329 |
| 2014/0293915 A1* | 10/2014 | Pelletier et al. ............. 370/329 |

FOREIGN PATENT DOCUMENTS

| JP | 2009-529263 A | 8/2009 |
| KR | 10-0804667 B1 | 2/2008 |

* cited by examiner

*Primary Examiner* — Huy D Vu
*Assistant Examiner* — James P Duffy
(74) *Attorney, Agent, or Firm* — Jefferson IP Law, LLP

(57) ABSTRACT

A random access method of a User Equipment (UE) in a wireless communication system supporting carrier aggregation which allows transmitting data on multiple carriers is provided. A random access method for a wireless communication system supporting carrier aggregation according to the present invention includes receiving, at a terminal, Random Access Channel (RACH) selection information necessary for random access, the RACH selection information being transmitted by a base station; selecting, when the random access is triggered, an uplink carrier on which the random access is attempted based on the RACH selection information; and attempting the random access on the selected uplink carrier.

20 Claims, 10 Drawing Sheets

WIRELESS COMMUNICATION SYSTEM AND RANDOM ACCESS METHOD THEREOF

TECHNICAL FIELD

The present invention relates to wireless communications and, in particular, to a random access method of a User Equipment (UE) in a wireless communication system supporting carrier aggregation which allows transmitting data on multiple carriers.

BACKGROUND ART

Mobile communication systems have been developed to provide the user with a communication service on the move. With the advance of technologies, the mobile communication systems have evolved to be able provide high speed data communication service as well as basic voice communication service. As one of the mobile communication technology standardization organizations, the 3rd Generation Partnership Project (3GPP) is working to improve its Long Term Evolution (LTE) standards. LTE is a high speed packet passed communication technology having higher data rate than that of current mobile communication systems.

In order to provide a data communication service, resource allocation is performed based on the data amount to be transmitted and channel condition.

Typically, the data communication service is provided with a resource management policy in which the resource is allocated on the basis of the data amount to be transmitted and channel condition unlike the voice communication server. In the mobile communication, a scheduler assigns resources to the user equipments in consideration of the available resource, channel condition, and data amount. The LTE system as one of the next generation mobile communication systems also operates with the scheduler which is located in the evolved Node B (eNB) and manages radio resources. Recently, there are many discussions to improve transmission bandwidth of the LTE system with the adoption of new technologies to meet the requirements of LTE-Advanced (LTE-A) standards. In the LTE-A system, multiple LTE/component carriers can be assigned to a single UE in order to increase transmission speed.

DISCLOSURE OF INVENTION

Technical Problem

In case of allocating multiple carriers to a single UE in the LTE-A system, however, it is difficult for the UE to determine the LTE carrier of which Random Access Channel (RACH) is used for the random access process.

There is therefore a need to develop a method for efficiently determining UL carrier of which RACH is used for random access.

Solution to Problem

In order to solve the problems of the prior arts, the present invention provides a method for determining a UL carrier for random access in an LTE-A system supporting carrier aggregation.

In accordance with an aspect of the present invention, a random access method for a wireless communication system supporting carrier aggregation includes receiving, at a terminal, Random Access Channel (RACH) selection information necessary for random access, the RACH selection information being transmitted by a base station; selecting, when the random access is triggered, an uplink carrier on which the random access is attempted based on the RACH selection information; and attempting the random access on the selected uplink carrier.

In accordance with another aspect of the present invention, a random access communication system includes a base station which configures and transmits Random Access Channel (RACH) selection information necessary for random access; and a terminal which selects, when the random access is triggered, an uplink carrier based on the RACH selection information and attempts the random access on the selected uplink carrier.

Advantageous Effects of Invention

As described above, the random access method of the present invention facilitates selecting the UL carrier for the random access based on the RACH selection information provided by the eNB in a wireless communication system supporting UL carrier aggregation.

BRIEF DESCRIPTION OF DRAWINGS

The above and other objects, features and advantages of the present invention will be more apparent from the following detailed description in conjunction with the accompanying drawings, in which.

MODE FOR THE INVENTION

Exemplary embodiments of the present invention are described with reference to the accompanying drawings in detail. The same reference numbers are used throughout the drawings to refer to the same or like parts. Detailed description of well-known functions and structures incorporated herein may be omitted to avoid obscuring the subject matter of the present invention.

The terms and words used in the description and claims are not to be limited to ordinary meanings or dictionary definitions. Under the principles that the inventors are entitled to act as his or her own lexicographer in order to explain his or her own invention in the best way, those terms and words are to be construed so as to conform to the technical concept of the present invention.

LTE adopts Orthogonal Frequency Division Multiple Access (OFDMA) as a multiple access scheme to provide downlink peak rates of at least 100 Mbps on the carrier bandwidth scalable up to 20 Mhz. The LTE also uses the Adaptive Modulation and Coding (AMC) in which the modulation scheme and channel coding scheme are selected according to the channel condition.

Figure 1:
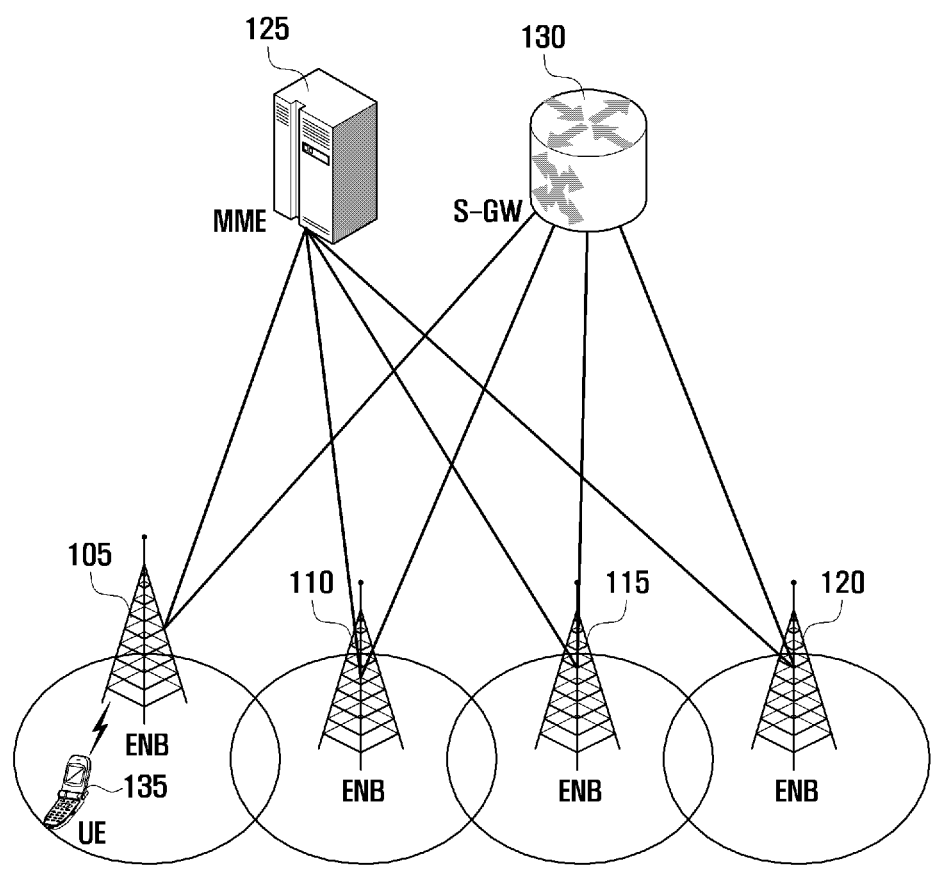
FIG. 1 is a schematic diagram illustrating a mobile communication system to which a random access method according to an embodiment of the present is applied.

FIG. 1 is a schematic diagram illustrating a mobile communication system to which a random access method according to an embodiment of the present is applied.

Referring to FIG. 1, the access networks of an LTE mobile communication system are composed of the base stations (hereinafter referred to interchangeably with "evolved Node B", eNB, and Node B) 105, 110, 115, and 120, a Mobility Management Entity (MME), and a Serving-Gateway (S-GW). The User Equipment (UE) 135 accesses an external network via one of the eNBs and S-GW 130.

Each of the eNBs 105, 110, 115, and 120 is an entity corresponding to a combination of a conventional Node B and a Radio Network Controller (RNC). The UE 135 can access each eNB which performs the functions more complicate than those of the convention base station. In LTE, all the user traffic including real time data service such as Voice over IP (VoIP) is serviced over the shared channel. Accordingly, there is a need of a device for collecting feedback information and scheduling based on the feedback information, and the eNBs 105, 110, 115, and 120 are responsible for these functions. Each eNB can have multiple cells.

The MME 125 is responsible for various control functions and connected to the eNBs 105, 110, 115, and 120.

In order to achieve the performance requirements of LTE-A standard, Carrier Aggregation (CA) has been recently proposed. The CA is a technique to aggregate two or more component carriers for supporting high data rate transmission over a wide bandwidth in both uplink and downlink directions unlike the conventional UE using a single uplink and single downlink carriers for transmission. With the adoption of CA, it is possible to increase the data rate of a UE. Each eNB can aggregate multiple available component carriers for transmission and reception. A description is made of the multicarrier allocation process of an eNB with reference to FIG. 2.

Figure 2:
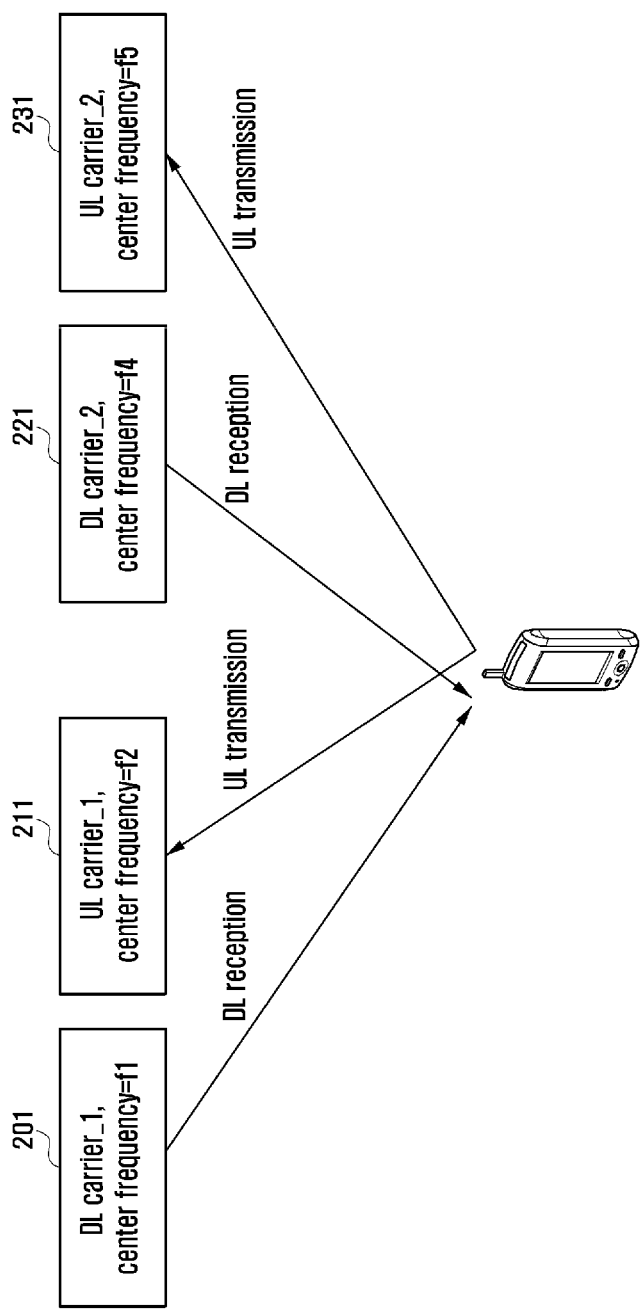
FIG. 2 is a diagram illustrating a principle of carrier aggregation for a UE in an LTE-A system according to an embodiment of the present invention.

FIG. 2 is a diagram illustrating a principle of carrier aggregation for a UE in an LTE-A system according to an embodiment of the present invention.

Suppose that the eNB has the two available downlink (DL) carriers of center frequencies F1 and F4 201 and 221 and two available uplink (UL) carriers of center frequencies F2 and F5 211 and 231. In this case, the UE can be allocated the DL carrier_1 201 and DL carrier_2 221 to receive data and the UL carrier_1 211 and UL carrier_2 231 to transmit data.

In this manner, the eNB can allocate maximum available number of carriers to the UE supporting CA according to the channel conditions, resulting in increase the data rate of the UE. Assuming that a single downlink carrier and a single uplink carrier constitutes a single cell in the traditional meaning, the CA can be understood as the technique for a UE to transmit and receive data via multiple cells. With the use of the CA technique, the peak data rate for a UE increases in proportion of a number of carriers aggregated.

The present invention proposes a method for selecting a UL carrier efficiently on which the CA-enabled UE performs random access.

For this purpose, the eNB configures RACH selection information for UE to select an uplink carrier for random access in consideration of the loads on the aggregated UL carriers including PRACH resources and sends the RACH selection information in the form of UE-specific signal or system information. The RACH selection information includes a pathloss threshold and Probability Factors (PFs) of UL carriers.

If the random access is triggered, the UE operating with aggregated UL carriers compares the measured pathloss value of a reference DL carrier linked to a reference UL carrier with the pathloss threshold. Here, the reference UL carrier can be the UL carrier linked to the reference or anchor DL carrier, or the eNB can notify the UE of a UL carrier explicitly by means of a UE-specific message or configures one of random access-available UL carriers which is capable of transmitting the RACH preamble most quickly as the UL carrier including PRACH resource.

The UE can check the time when the PRACH resource of each UL carrier is available on the time axis by referencing the PRACH resource allocation information on each UL carrier. With the PRACH resource allocation information, the UE can determine which UL carrier has the PRACH resource which can be most quickly used to transmit the RACH preamble. The PRACH resource allocation information (e.g., PRACH-Config information specified in the 3GPP LTE standard TS36.331) can be transmitted in the system information or a UE-specific message. Assuming that UL carrier_1 and UL carrier_2 are aggregated, and it is notified, by the PRACH resource allocation information of the UL carrier_1, that the UL carrier_1 has the PRACH resource after three subframe from the time point when the random access is triggered and it is notified, by the PRACH resource allocation information of the UL carrier_2, that the UL carrier_2 has the PRACH resource after 6 subframe from the time point when the random access is triggered; the UE selects the UL carrier_1 having the PRACH resource which is capable of most quickly transmitting the RACH preamble as the reference UL carrier. The UL carrier selection for random access can be performed in various ways but not limited to the aforementioned way.

If the measured pathloss value of the (reference) DL carrier linked the reference UL carrier is (equal to or) less than the pathloss threshold received from the eNB, the UE transmits the RACH preamble on the PRACH resource of the reference carrier. Otherwise, if the measured pathloss value of the (reference) DL carrier linked the reference UL carrier is (equal to or) greater than the pathloss threshold received from the eNB, the UE selects a UL carrier linked to the DL carrier of which measured pathloss has the least value.

According to another embodiment of the present invention, the UE can select the UL carrier of the frequency bandwidth having the least center frequency. The UE also can select the UL carrier having the PRACH resource which can most quickly transmit the RACH preamble among the random access-available UL carriers excluding reference UL carrier or the UL carrier of which corresponding DL carrier has the measured pathloss value (equal to or) less than the pathloss threshold received from the eNB. The UE generates a random value (e.g., a value between 0 and 1) to the reselected UL carrier and compares the random value with the PF value corresponding to the UL carrier selected based on the RACH selection information received from the eNB.

If the random value is (equal to or) less than the PF value, the UE transmits the RACH preamble on the PRACH resource of the selected UL carrier. Otherwise, if the random value (equal to or) greater than the PF value, the UE cancels the candidacy of the UL carrier for random access and selects the UL carrier linked to the DL carrier of which pathloss is least, the UL carrier having the least center frequency, the UL carrier having the RACH resource which is able to most quickly transmit the RACH preamble, or the UL carrier of which linked DL carrier has the pathloss value (equal to or) less than the path loss threshold received from the eNB, among the rest DL carriers. These steps are repeated until UE determines the UL carrier for random access or there is any UL carrier available for random access no more. If there is any UL carrier available for random access no more, the UE transmits the RACH preamble on the PRACH resource of the reference UL carrier.

According to another embodiment of the present invention, when the random access is triggered to the UE using aggregated UL carriers available for random access, the UE selects the UL carrier having the PRACH resource which is capable of transmitting the RACH preamble most quickly among the UL carriers. The UE can determine which UL carrier has the PRACH resource which can be most quickly used to transmit the RACH preamble based on the PRACH resource allocation information.

According to another embodiment of the present invention, at least two methods of the above described embodiments can be used in a combined manner. That is, the eNB transmits the RACH selection information including the pathloss threshold value and PF values of individual UL carriers in a UE-specific message or system information. If a random access is triggered, the UE using the aggregated UL carriers having PRACH resource checks if the random access is triggered for a delay sensitive message/data transmission. For example, if the random access is triggered for the transmission of message/data on a specific logical channel, the transmission of message/data through a specific Radio Bearer (e.g., Signaling Radio Bearer_1 (SRB_1)), or the transmission of measurement report control message or other handover related control message triggering handover, the UE identifies that the random access is triggered for the delay sensitive message/data transmission. These specific logical channel/specific radio bearer/specific control messages can be fixedly predetermined according to the standard, or eNB can notify the UE that which logical channel/radio bearer/control message is dealt as the delay sensitive message/data by means of a UE-specific message or system information.

If the random access is triggered for the transmission of the delay sensitive data, the UE selects the UL carrier having the PRACH resource which is capable of most quickly transmitting the RACH preamble and transmits the RACH preamble on the RACH resource of the selected URL carrier. If the random access is triggered for the transmission of non-delay sensitive data, the UE determines the UL carrier for random access by comparing the measured pathloss value of the (reference) DL carrier linked to the reference UL carrier. At this time, if it is determined that the reference UL carrier is not available for the random access, the UE selects the UL carrier of which the corresponding DL carrier has the least measured pathloss or which has the least center frequency and generates a random access. Next, the UE compares the random value with the PF value of the corresponding UL carrier to determine whether to perform random access on the selected UL carrier. A description is made of a method for determining whether to perform the random access based on the RACH selection information with reference to FIGS. 3 to 10.

Figure 3:
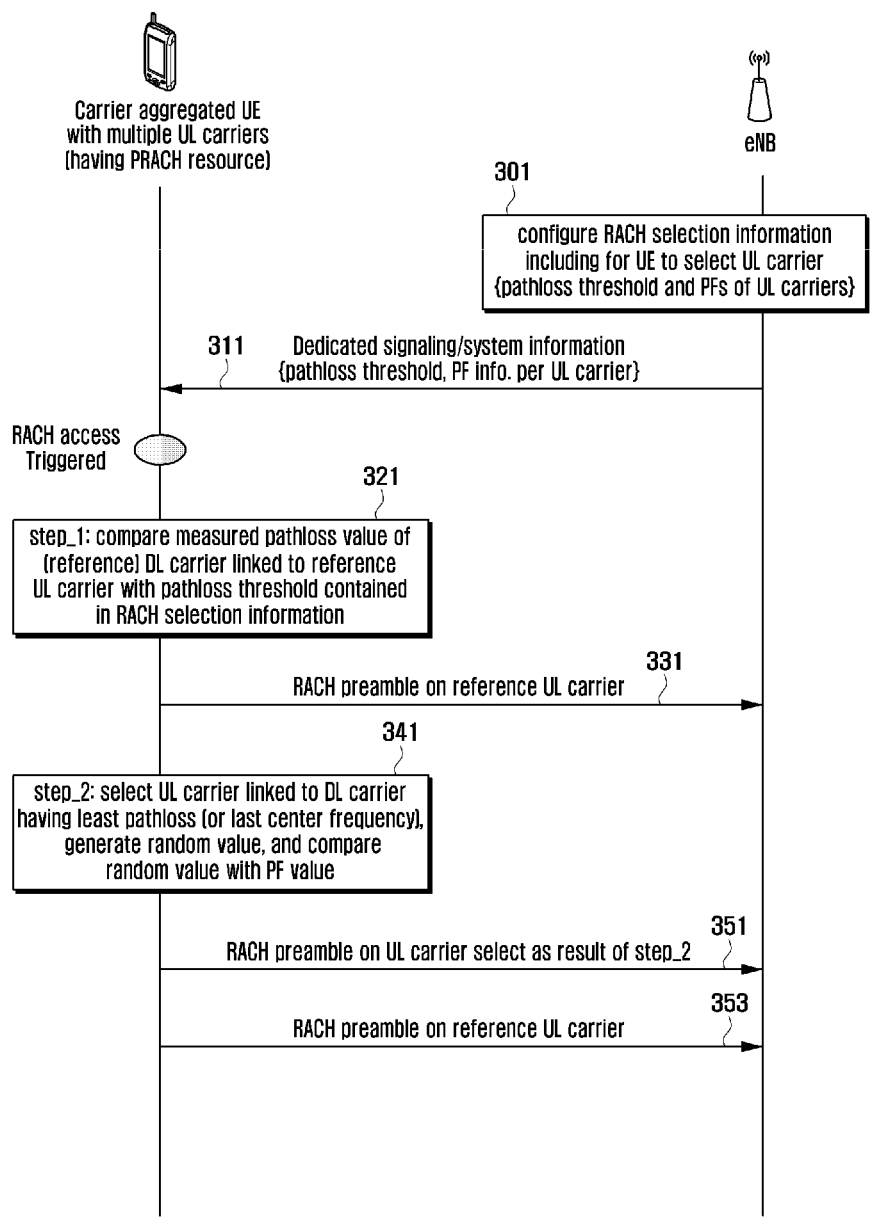
FIG. 3 is a signaling diagram illustrating a UL carrier selection procedure for random access in a wireless communication system according to the first embodiment of the present invention.

FIG. 3 is a signaling diagram illustrating a UL carrier selection procedure for random access in a wireless communication system according to the first embodiment of the present invention.

Referring to FIG. 3, the eNB configures the RACH selection information including the pathloss threshold and PFs of the individual UL carriers that is necessary for the UE to select the UL carrier for random access, in consideration of the loads of the aggregated UL carriers having PRACH resources (301). The eNB sends the RACH selection information to the corresponding UE by means of a dedicated signaling or system information (311).

If a random access is triggered, the UE using the aggregated UL carriers with PRACH resource compares the measured pathloss value of the (reference) DL carrier linked to the reference UL carrier with the pathloss threshold contained in the RACH selection information (321). Here, the UE can select, as the reference UL carrier, the UL carrier linked to the reference or anchor DL carrier (implicit notification), the UL carrier notified explicitly by the eNB in a UE-specific message (explicit notification), or the UL carrier having the RACH resource which is capable of being used for most quickly transmitting the RACH preamble.

The UE can check the time when the PRACH resource of each UL carrier is available, based on the PRACH resource allocation information. Accordingly, the UE can determine which UL carrier has the PRACH resource capable of transmitting the PRACH preamble most quickly. Here, the PRACH resource allocation information (e.g., PRACH-Config information specified in the 3GPP LTE standard TS36.331) can be transmitted in the system information or a UE-specific message. For example, assuming that UL carrier_1 and UL carrier_2 are aggregated, and it is notified, by the PRACH resource allocation information of the UL carrier_1, that the UL carrier_1 has the PRACH resource after three subframe from the time point when the random access is triggered and it is notified, by the PRACH resource allocation information of the UL carrier_2, that the UL carrier_2 has the PRACH resource after 6 subframe from the time point when the random access is triggered; the UE selects the UL carrier_1 having the PRACH resource which is capable of most quickly transmitting the RACH preamble as the reference UL carrier. The UL carrier selection for random access can be performed in various ways but not limited to the aforementioned way.

If the measured pathloss value of the (reference) DL carrier linked to the reference UL carrier is (equal to or) less than the pathloss threshold received from the eNB, the UE sends the RACH preamble on the PRACH resource of the reference carrier (331). Otherwise, if the measured pathloss value of the (reference) DL carrier linked to the reference UL carrier is (equal to or) greater than the pathloss threshold received from the eNB, the UE selects a UL carrier linked to the DL carrier of which measured pathloss has the least value, the UL carrier of the frequency bandwidth having the least center frequency, the UL carrier having the PRACH resource which can most quickly transmit the RACH preamble among the random access-available UL carriers excluding reference UL carrier, or the UL carrier of which corresponding DL carrier has the measured pathloss value (equal to or) less than the pathloss threshold received from the eNB. Next, the UE generates a random value (e.g., a value between 0 and 1) to the reselected UL carrier and compares the random value with the PF value corresponding to the UL carrier selected based on the RACH selection information received from the eNB (341).

If the random value is (equal to or) less than the PF value, the UE transmits the RACH preamble on the PRACH resource of the selected UL carrier (351). Otherwise, if the random value (equal to or) greater than the PF value, the UE cancels the candidacy of the UL carrier for random access and selects the UL carrier linked to the DL carrier of which pathloss is least, the UL carrier having the least center frequency, the UL carrier having the RACH resource which is capable to most quickly transmit the RACH preamble, or the UL carrier of which linked DL carrier has the pathloss value (equal to or) less than the path loss threshold received from the eNB, among the rest DL carriers. Next, the UE generates a random value and compares the random value with the PF value corresponding to the selected UL carrier to determine whether to perform the random access on the reselected UL carrier.

These steps are repeated until UE determines the UL carrier for random access or there is any UL carrier available for random access no more. If there is any UL carrier available for random access no more, the UE transmits the RACH preamble on the PRACH resource of the reference UL carrier (353). The UE can attempt the access to the network through steps 341 to 353, skipping steps 321 to 331.

Figure 4:
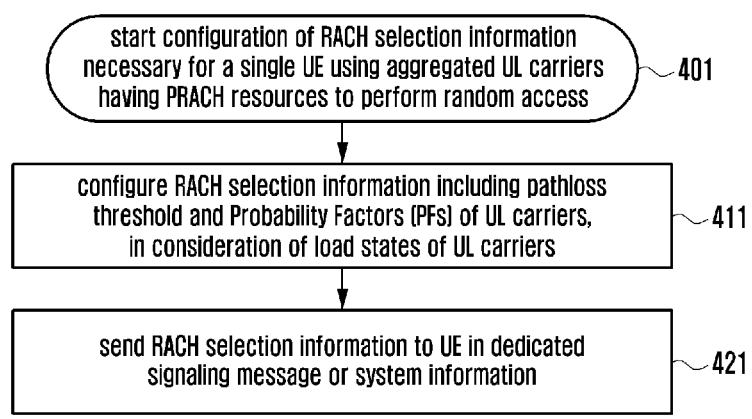
FIG. 4 is a flowchart illustrating steps of the UL carrier selection procedure that are performed in the eNB according to the first embodiment of the present invention.

FIG. 4 is a flowchart illustrating steps of the UL carrier selection procedure that are performed in the eNB according to the first embodiment of the present invention.

Referring to FIG. 4, the eNB starts configuration of the RACH selection information necessary for a single UE using the aggregated UL carriers having PRACH resources to perform random access (401). Here, the eNB configures the RACH selection information including a pathloss threshold and Probability Factors (PFs) of individual UL carriers, in consideration of the load states of individual aggregated UL carriers, that is necessary for the UE to perform random access (411). Next, the eNB sends the RACH selection information to the corresponding UE in a dedicated signaling message or system information (421).

Figure 5:
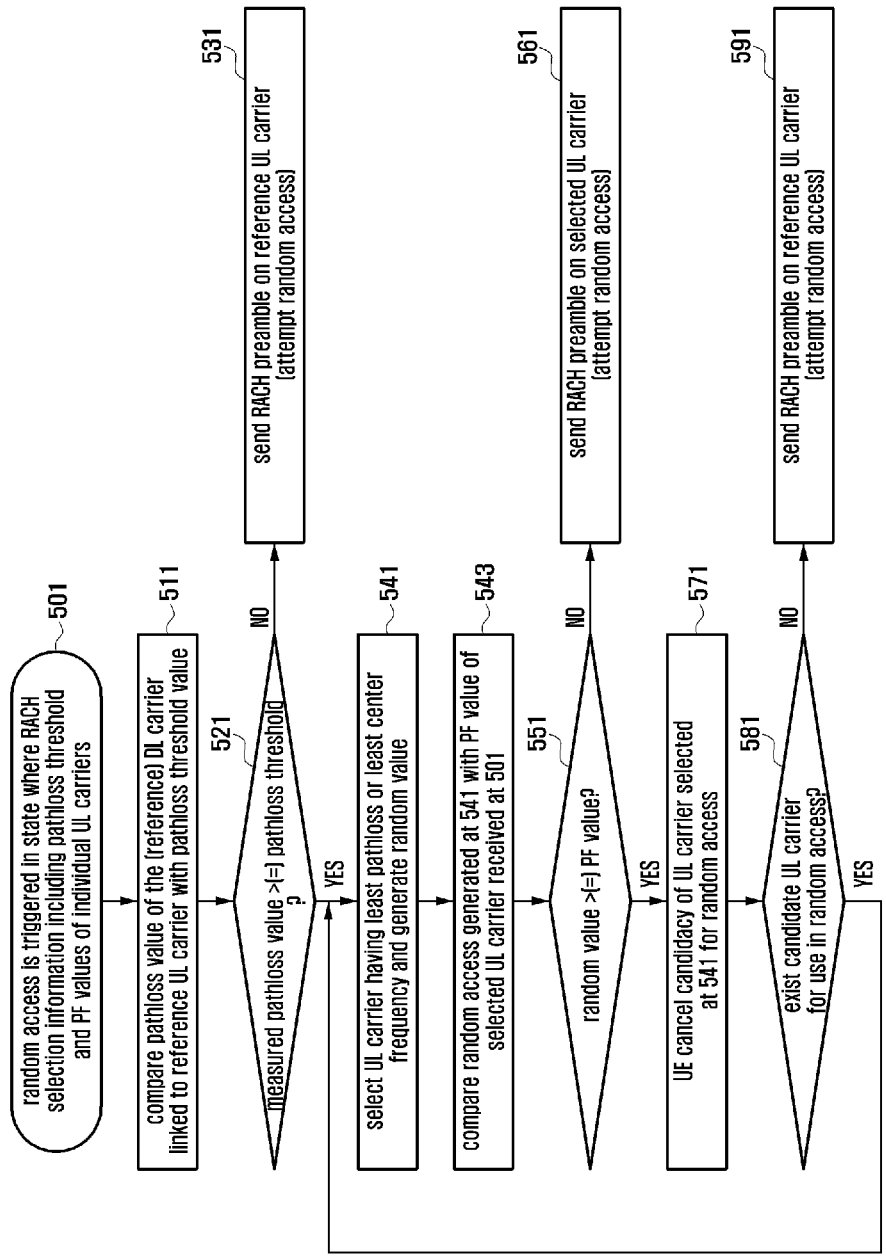
FIG. 5 is a flowchart illustrating steps of the UL carrier selection procedure that are performed in the UE according to the first embodiment of the present invention.

FIG. 5 is a flowchart illustrating steps of the UL carrier selection procedure that are performed in the UE according to the first embodiment of the present invention.

Referring to FIG. 5, if a random access is triggered in the state where the RACH selection information including the pathloss threshold and PF values of the individual UL carriers (501), the UE compares the pathloss value of the (reference) DL carrier linked to the reference UL carrier with the pathloss threshold value (511).

Here, the reference UL carrier can be the UL carrier linked to the reference or anchor DL carrier (implicit notification), the UL carrier notified explicitly by the eNB in a UE-specific message (explicit notification), or the UL carrier having the RACH resource which is capable of being used for most quickly transmitting the RACH preamble.

The UE can check the time when the PRACH resource of each UL carrier is available, based on the PRACH resource allocation information. Here, the PRACH resource allocation information (e.g., PRACH-Config information specified in the 3GPP LTE standard TS36.331) can be transmitted in the system information or a dedicated message. For example, assuming that UL carrier_1 and UL carrier_2 are aggregated, and it is notified, by the PRACH resource allocation information of the UL carrier_1, that the UL carrier_1 has the PRACH resource after three subframe from the time point when the random access is triggered and it is notified, by the PRACH resource allocation information of the UL carrier_2, that the UL carrier_2 has the PRACH resource after 6 subframe from the time point when the random access is triggered; the UE selects the UL carrier_1 having the PRACH resource which is capable of most quickly transmitting the RACH preamble as the reference UL carrier. The UL carrier selection for random access according to the present invention can be performed in various ways but not limited to the aforementioned way.

If the measured pathloss value of the (reference) DL carrier linked to the reference UL carrier is (equal to or) less than the pathloss threshold received from the eNB at step 521, the UE sends the RACH preamble on the PRACH resource of the reference carrier (531). That is, the UE perform random access on the reference UL carrier.

Otherwise, if the measured pathloss value of the (reference) DL carrier linked to the reference UL carrier is (equal to or) greater than the pathloss threshold received from the eNB at step 521, the UE selects a UL carrier linked to the DL carrier of which measured pathloss has the least value, the UL carrier of the frequency bandwidth having the least center frequency, the UL carrier having the PRACH resource which can most quickly transmit the RACH preamble among the random access-available UL carriers excluding reference UL carrier, or the UL carrier of which corresponding DL carrier has the measured pathloss value (equal to or) less than the pathloss threshold received from the eNB, and then generates a random value (e.g., a value between 0 and 1) to the reselected UL carrier (541). Next, the UE compares the random value with the PF value corresponding to the UL carrier selected based on the RACH selection information received from the eNB (543).

If the random value is (equal to or) less than the PF value at step 551, the UE transmits the RACH preamble on the PRACH resource of the selected UL carrier (561). That is, the UE performs a random access on the selected UL carrier. Otherwise, if the random value (equal to or) greater than the PF value at step 551, the UE cancels the candidacy of the UL carrier for random access (571). Next, the UE determines whether there is the UL carrier remained as a candidate for the random access (581).

If there is any UL carrier as a candidate for the random access, the UE repeats steps 541 to 581. That is, the UE selects the UL carrier linked to the DL carrier of which pathloss is least, the UL carrier having the least center frequency, the UL carrier having the RACH resource which is capable to most quickly transmit the RACH preamble, or the UL carrier of which linked DL carrier has the pathloss value (equal to or) less than the path loss threshold received from the eNB, among the rest DL carriers; and generates a random value. Next, the UE compares the random value with the PF value corresponding to the selected UL carrier to determine whether to perform the random access on the reselected UL carrier. These steps are repeated until UE determines the UL carrier for random access or there is any UL carrier available for random access no more.

If there is any UL carrier available for random access no more at step 581, the UE transmits the RACH preamble on the PRACH resource of the reference UL carrier (591). Here, the UE can attempt the access to the network through steps 541 to 591, skipping steps 501 to 531.

Figure 6:
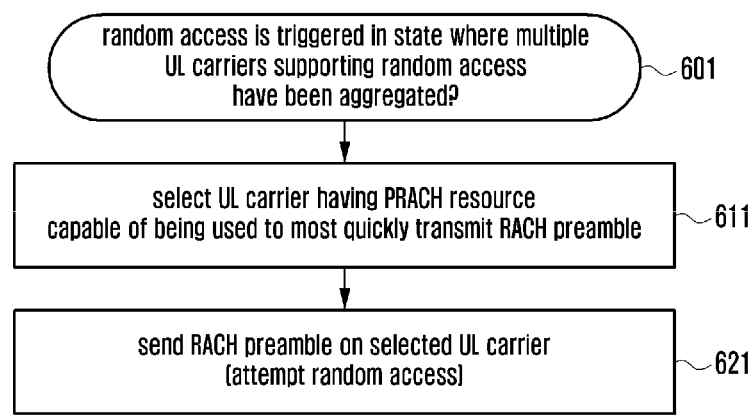
FIG. 6 is a flowchart illustrating steps of the UL carrier selection procedure that are performed in the UE according to the second embodiment of the present invention.

FIG. 6 is a flowchart illustrating steps of the UL carrier selection procedure that are performed in the UE according to the second embodiment of the present invention.

Referring to FIG. 6, the UE can attempt the random access without receiving specific information from the eNB. In more detail, if a random access is triggered in the state where multiple UL carriers supporting random access have been aggregated (601), the UE selects a UL carrier having the PRACH resource that is capable of being used to most quickly transmit the RACH preamble (611). Next, the UE sends the RACH preamble on the PRACH resource of the selected UL carrier (621). That is, the UE attempts the random access on the selected UL carrier. At this time, the LIE can identify the UL carrier of which PRACH resource is capable of being used to most quickly transmit the RACH preamble based on the PRACH resource allocation information.

For example, assuming that UL carrier_1 and UL carrier_2 are aggregated, and it is notified, by the PRACH resource allocation information (e.g., PRACH-Config information specified in the 3GPP LTE standard TS36.331) of the UL carrier_1, that the UL carrier_1 has the PRACH resource after three subframe from the time point when the random access is triggered and it is notified, by the PRACH resource allocation information of the UL carrier_2, that the UL carrier_2 has the PRACH resource after 6 subframe from the time point when the random access is triggered; the UE selects the UL carrier_1 having the PRACH resource which is capable of most quickly transmitting the RACH preamble as the reference UL carrier and performs the random access on the PRACH resource of the UL carrier_1.

Figure 7:
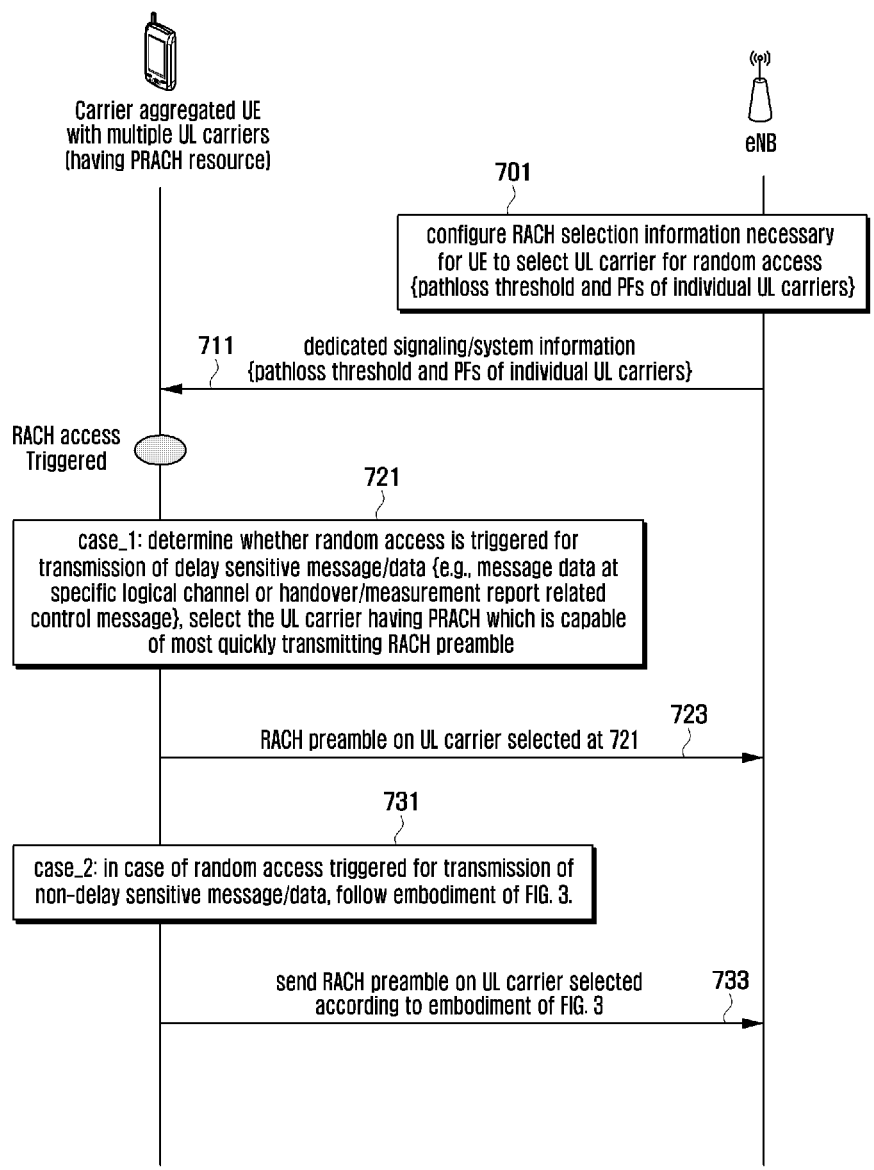
FIG. 7 is a signaling diagram illustrating a UL carrier selection procedure for random access in a wireless communication according to the third embodiment of the present invention.

FIG. 7 is a signaling diagram illustrating a UL carrier selection procedure for random access in a wireless communication according to the third embodiment of the present invention.

Referring to FIG. 7, the eNB configures the RACH selection information including the pathloss threshold and PFs of individual UL carriers that is necessary for the UE to select the UL carrier for random access, in consideration of the loads of the aggregated UL carriers having PRACH resources (701). Next, the eNB sends the RACH selection information to the corresponding UE by means of a dedicated signaling or system information (711).

If a random access is triggered, the UE using the aggregated UL carriers with PRACH resources determines whether the random access is triggered for the transmission of delay sensitive message/data and, if it is, selects the UL carrier having the PRACH which is capable of most quickly transmitting the RACH preamble (721). Next, the UE sends the RACH preamble on the PRACH resource of the selected UL carrier (723). At this time, the UE can identify the UL carrier of which PRACH resource is capable of being used to most quickly transmit the RACH preamble based on the PRACH resource allocation information as described with reference to FIG. 6. The UE also can identify the delay sensitive message/data based on the logical channel at which the message/data is generated and the radio bearer on which the message/data is transmitted (e.g., Signaling Radio Bearer_1 (SRB_1)) and by regarding the measurement report control message that can trigger a handover or other handover-related control message as the delay sensitive message.

These specific logical channel/specific radio bearer/specific control messages can be fixedly predetermined according to the standard, or eNB can notify the UE that which logical channel/radio bearer/control message should be dealt as the delay sensitive message/data by means of a UE-specific message or system information. If the random access is triggered for the transmission of non-delay sensitive message/data, the UE performs steps 301 to 341 of FIG. 3 (731). Next, the UE sends the RACH preamble on the PRACH resource of the UL carrier selected according to the method described with reference to FIG. 3 (733).

The eNB performs operations for supporting the UL carrier selection procedure is identical with those described with reference to FIG. 4. A description is made of the operation of the UE with reference to FIG. 8.

Figure 8:
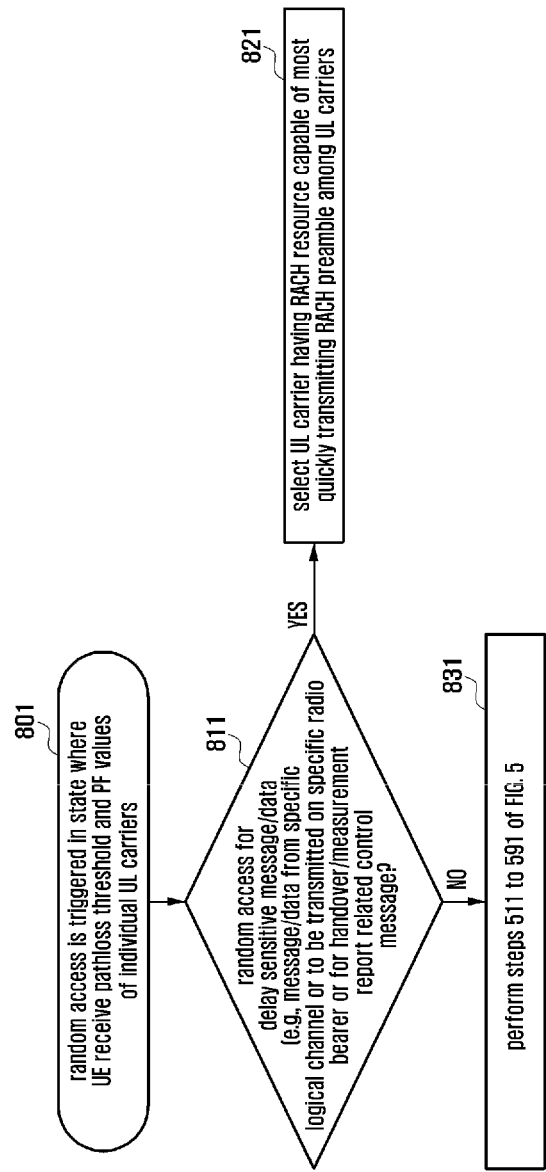
FIG. 8 is a flowchart illustrating steps of the UL carrier selection procedure that are performed in the UE according to the third embodiment of the present invention.

FIG. 8 is a flowchart illustrating steps of the UL carrier selection procedure that are performed in the UE according to the third embodiment of the present invention.

Referring to FIG. 8, if a random access is triggered in the state where the UE has received the RACH selection information including the pathloss threshold and PF values of individual UL carriers by means of the dedicated message or the system information (801), the UE checks whether the random access is triggered for the transmission of delay sensitive message/data (811). For example, The UE also can identify the delay sensitive message/data based on the logical channel at which the message/data is generated and the radio bearer on which the message/data is transmitted (e.g., Signaling Radio Bearer_1 (SRB_1)) and by regarding the measurement report control message that can trigger a handover or other handover-related control message as the delay sensitive message.

If the random access is triggered for the transmission of delay sensitive message/data at step 811, the UE selects the UL carrier having the PRACH resource that is capable of being used to most quickly transmit the RACH preamble (821). Next, the UE performs random access on the selected UL carrier. Otherwise, if the random access is triggered for the transmission of non-delay sensitive message/data, the UE performs steps 511 to 591 of FIG. 5 (831).

Figure 9:
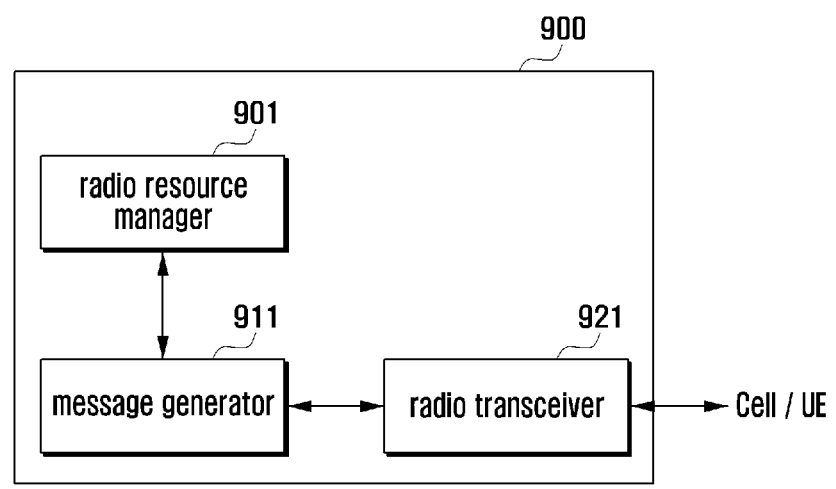
FIG. 9 is a block diagram illustrating a configuration of the eNB for supporting the random access method according to an embodiment of the present invention.

FIG. 9 is a block diagram illustrating a configuration of the eNB for supporting the random access method according to an embodiment of the present invention.

Referring to FIG. 9, the eNB 900 includes a radio resource manager 901, a message generator 911, and a radio transceiver 921.

The radio resource manager 901 checks the load states of individual UL/DL carriers and configures radio channel appropriately. The message generator 911 generates the UE-specific message or system information containing a pathloss threshold and PF values of the individual carriers. The radio transceiver 921 transmits the UE-specific message and system information to the cell/UE.

Figure 10:
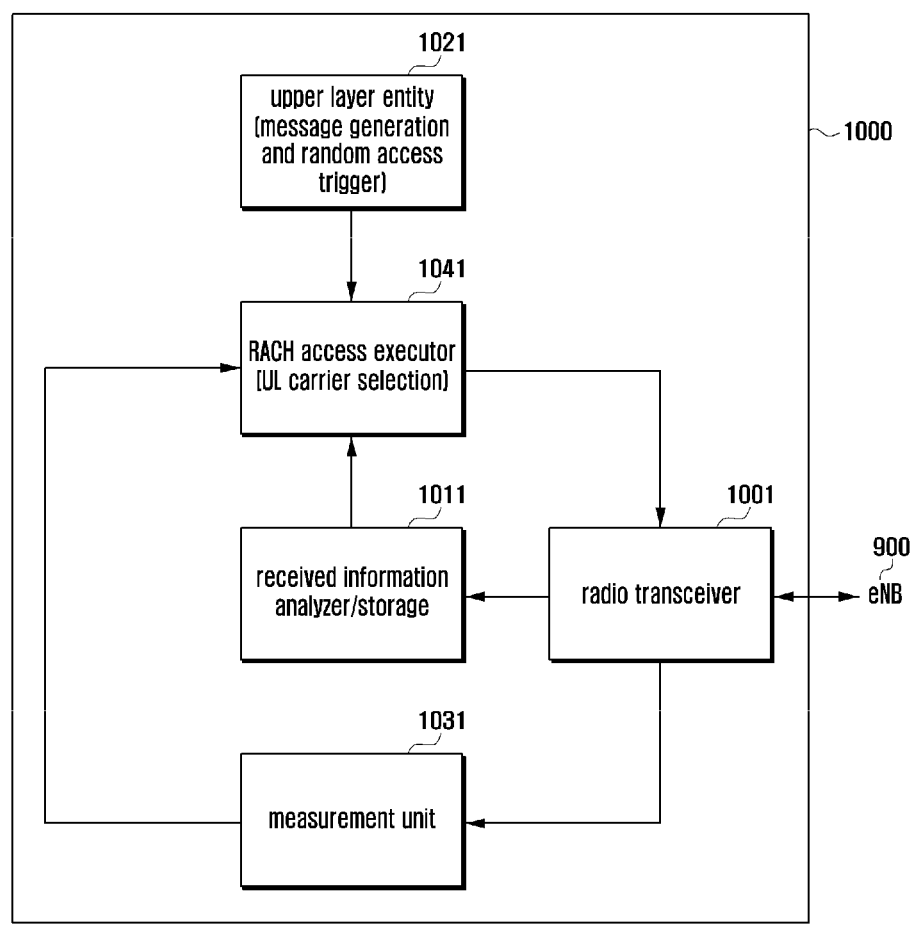
FIG. 10 is a block diagram illustrating a configuration of the UE for supporting the random access method according to an embodiment of the present invention.

FIG. 10 is a block diagram illustrating a configuration of the UE for supporting the random access method according to an embodiment of the present invention.

Referring to FIG. 10, the UE 1000 includes a radio transceiver 1001, a received signal analyzer/storage 1011, an upper layer entity 1021, a measurement unit 1301, and an RACH access executer 1041.

The UE receives the RACH selection information transmitted by the eNB 900 by means of the radio transceiver 1001. The received information analyzer/storage 1011 analyzes the received RACH selection information. The upper layer entity 1021 generates a message/data to be transmitted and, the RACH access executer 1041 attempts random access to the network. In order to attempt the random access, the RACH access executer 1041 selects the UL carrier on which the random access is attempted using the logical channel ID with which the message/data is generated, radio bearer ID for transmitting the message/data, type of the transmission message, information on the message, and pathloss threshold and PF values provided by the received information analyzer/storage 1011, pathloss values of individual UL carriers that are measured by the measurement unit 1031, and the random value generated by the RACH access executor 1041. The RACH access executor 1041 performs the random access on the selected UL carrier.

As described above, the random access method of the present invention facilitates selecting the UL carrier for the random access based on the RACH selection information provided by the eNB in a wireless communication system supporting UL carrier aggregation.

Although exemplary embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

The invention claimed is:

1. A method for transmitting information by a terminal in a wireless communication system supporting carrier aggregation, the method including:
   receiving, from a base station, information for a random access including a threshold value of a downlink pathloss and a probability factor value of at least one uplink carrier; and
   transmitting, to the base station, a random access preamble for transmitting a message on an uplink carrier,
   wherein the uplink carrier is selected based on physical random access channel (PRACH) scheduling information corresponding to the uplink carrier, if the message comprises at least one information corresponding to a predetermined type,
   wherein the uplink carrier is selected based on a downlink pathloss linked to the uplink carrier, a center frequency of the uplink carrier, and the threshold value of the downlink pathloss, if the message does not comprise the at least one information corresponding to the predetermined type, and
   wherein the type of the information is identified based on a delay sensitivity of the information.

2. The method of claim 1, wherein the uplink carrier is selected based on a pathloss value of a downlink carrier linked to a reference uplink carrier.

3. The method of claim 2, wherein the uplink carrier is selected based on the probability factor value of the uplink carrier and a random value generated by the terminal.

4. The method of claim 1, wherein the uplink carrier is selected based on a physical random access channel resource of the uplink carrier.

5. The method of claim 1, wherein the uplink carrier is selected based on a physical random access channel resource of the uplink carrier and aggregated uplink carriers available for random access for the terminal.

6. The method of claim 1, wherein the message includes at least one of a message for a specific logical channel, a message for transmitting data on a radio bearer, and a handover-related message.

7. The method of claim 1, wherein the random access preamble is transmitted using a physical random access channel (PRACH) resource of the uplink carrier.

8. A terminal for transmitting information in a wireless communication system, the terminal including:
   a transceiver for transmitting and receiving a signal; and
   a controller configured to receive, from a base station, information for random access including a threshold value of a downlink pathloss and a probability factor value of at least one uplink carrier, and to transmit, to the base station, a random access preamble for transmitting a message on an uplink carrier,
   wherein the uplink carrier is selected based on physical random access channel (PRACH) scheduling information corresponding to the uplink carrier, if the message comprises at least one information corresponding to a predetermined type,
   wherein the uplink carrier is selected based on a downlink pathloss linked to the uplink carrier, a center frequency of the uplink carrier, and the threshold value of the downlink pathloss, if the message does not comprise the at least one information corresponding to the predetermined type, and
   wherein the type of the information is identified based on a delay sensitivity of the information.

9. The terminal of claim 8, wherein the uplink carrier is selected based a pathloss value of a downlink carrier linked to a reference uplink carrier.

10. The terminal of claim 9, wherein the uplink carrier is selected based on the probability factor value of the uplink carrier and a random value generated by the controller.

11. The terminal of claim 8, wherein the uplink carrier is selected based on a physical random access channel resource of the uplink carrier.

12. The terminal of claim 8, wherein the uplink carrier is selected based on a physical random access channel resource of the uplink carrier and aggregated uplink carriers available for random access for the terminal.

13. The terminal of claim 8, wherein the message includes at least one of a message for a specific logical channel, a message for transmitting data on a radio bearer, and a handover-related message.

14. The terminal of claim 8, wherein the random access preamble is transmitted using a physical random access channel (PRACH) resource of the uplink carrier.

15. A method for receiving information by a base station in a wireless communication system supporting carrier aggregation, the method including:
   transmitting, to a terminal, information for a random access including a threshold value of a downlink pathloss and a probability factor value of at least one uplink carrier; and
   receiving, from the terminal, a random access preamble for receiving a message on an uplink carrier,
   wherein the uplink carrier is selected based on physical random access channel (PRACH) scheduling information corresponding to the uplink carrier, if the message comprises at least one information corresponding to a predetermined type,
   wherein the uplink carrier is selected based on a downlink pathloss linked to the uplink carrier, a center frequency of the uplink carrier, and the threshold value of the downlink pathloss, if the message does not comprise the at least one information corresponding to the predetermined type, and
   wherein the type of the information is identified based on a delay sensitivity of the information.

16. The method of claim 15, wherein the uplink carrier is selected based on a pathloss value of a downlink carrier linked to a reference uplink carrier.

17. The method of claim 16, the uplink carrier is selected based on the probability factor value of the uplink carrier and a random value generated by the terminal.

18. A base station for receiving information in a wireless communication system supporting carrier aggregation, the base station including:
   a transceiver for transmitting and receiving a signal; and
   a controller configured to transmit, to a terminal, information for a random access including a threshold value of a downlink pathloss and a probability factor value of at least one uplink carrier, and to receive, from the terminal, a random access preamble for receiving a message on an uplink carrier, wherein the uplink carrier is selected based on physical random access channel (PRACH) scheduling information corresponding to the uplink carrier, if the message comprises at least one information corresponding to a predetermined type, wherein the uplink carrier is selected based on a downlink pathloss linked to the uplink carrier, a center frequency of the uplink carrier, and the threshold value of the downlink pathloss, if the message does not comprise the at least one information corresponding to the predetermined type, and wherein the type of the information is identified based on a delay sensitivity of the information.

19. The base station of claim 18, wherein the uplink carrier is selected based on a pathloss value of a downlink carrier linked to a reference uplink carrier.

20. The base station of claim 19, the uplink carrier is selected based on the probability factor value of the uplink carrier and a random value generated by the terminal.

* * * * *